J. F. PRIBNOW.
SAW SWAGING, SHAPING, AND GRINDING MACHINE.
APPLICATION FILED JUNE 4, 1914.
1,179,556.
Patented Apr. 18, 1916.
14 SHEETS—SHEET 9.
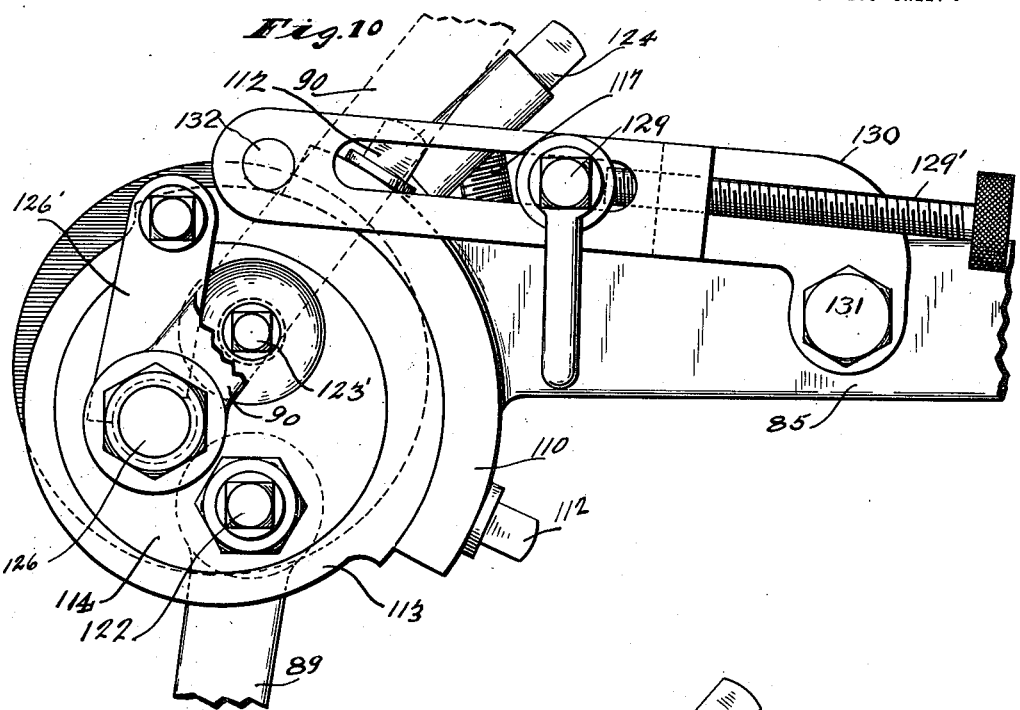
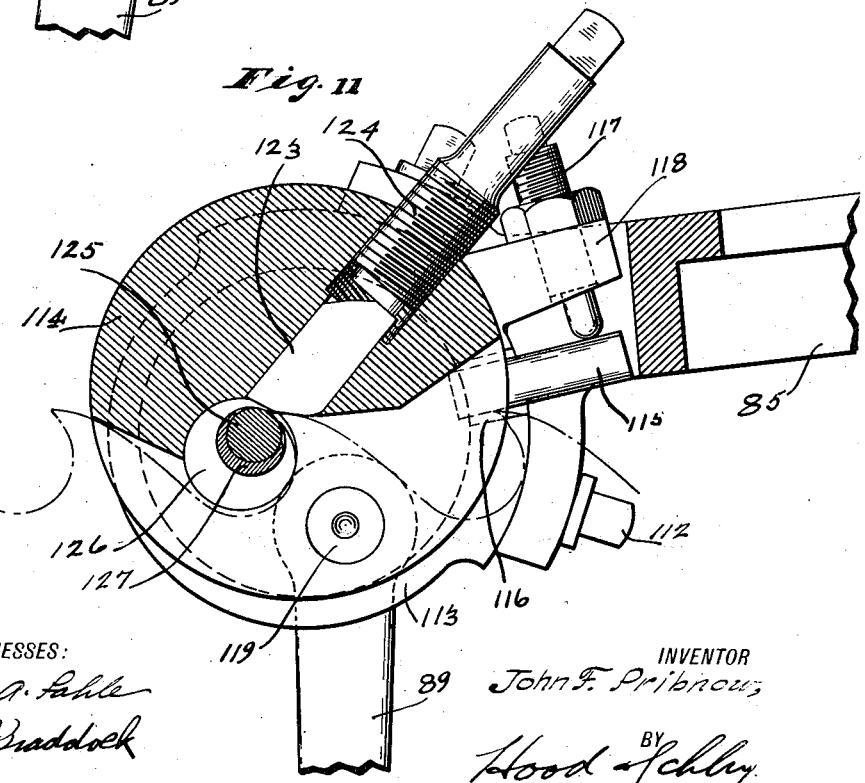
WITNESSES:
INVENTOR
John F. Pribnow
BY
Hood Schley
ATTORNEYS.

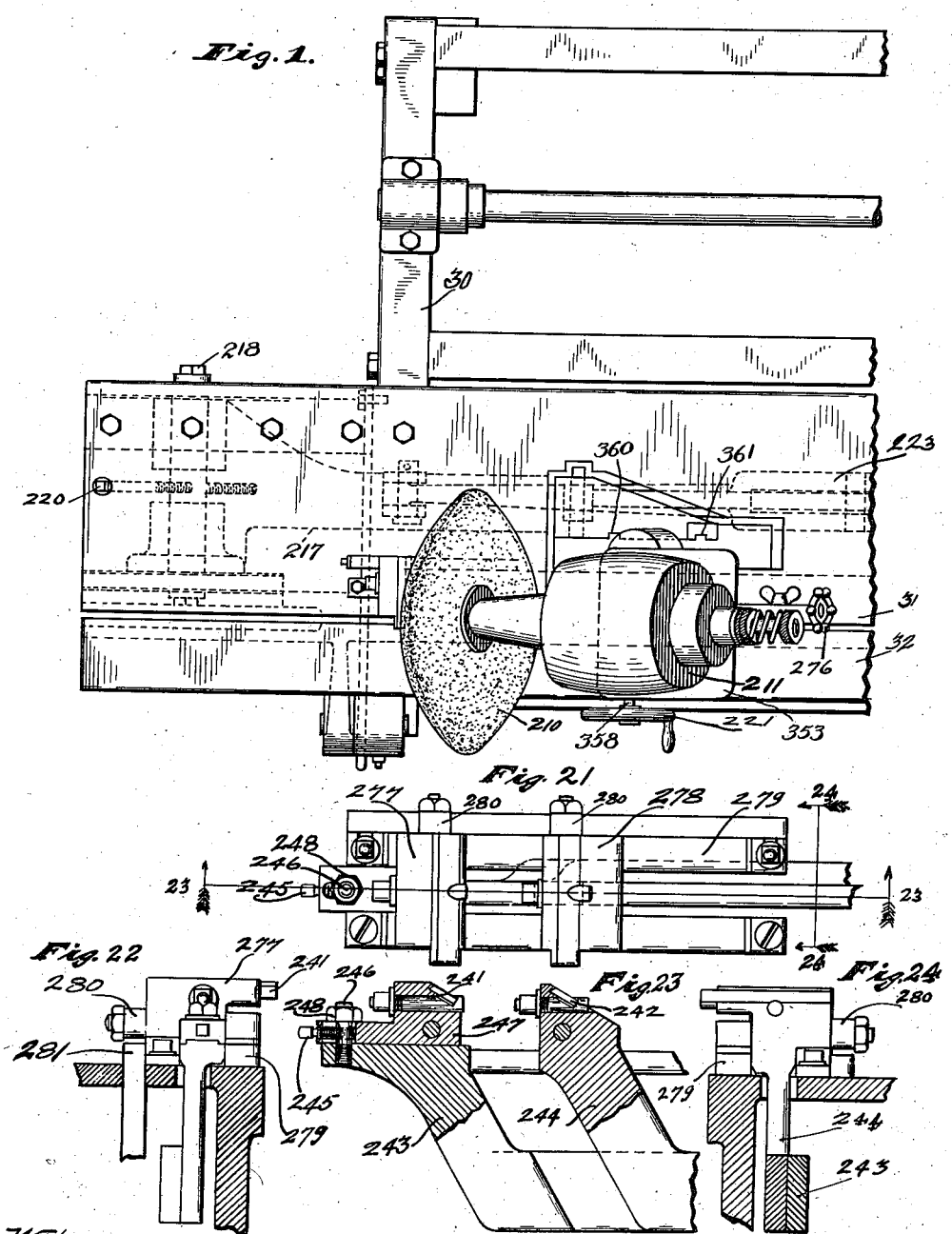

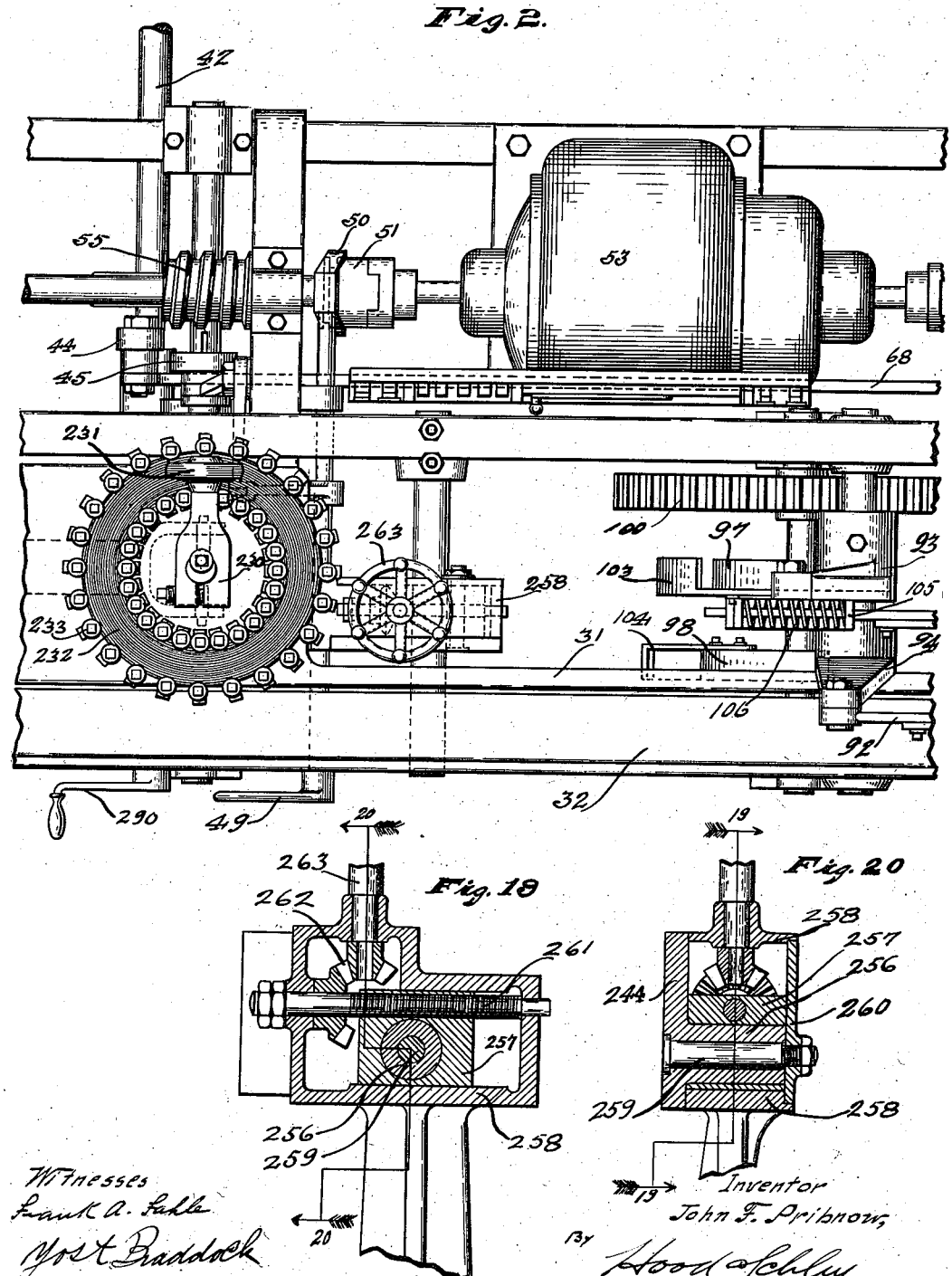

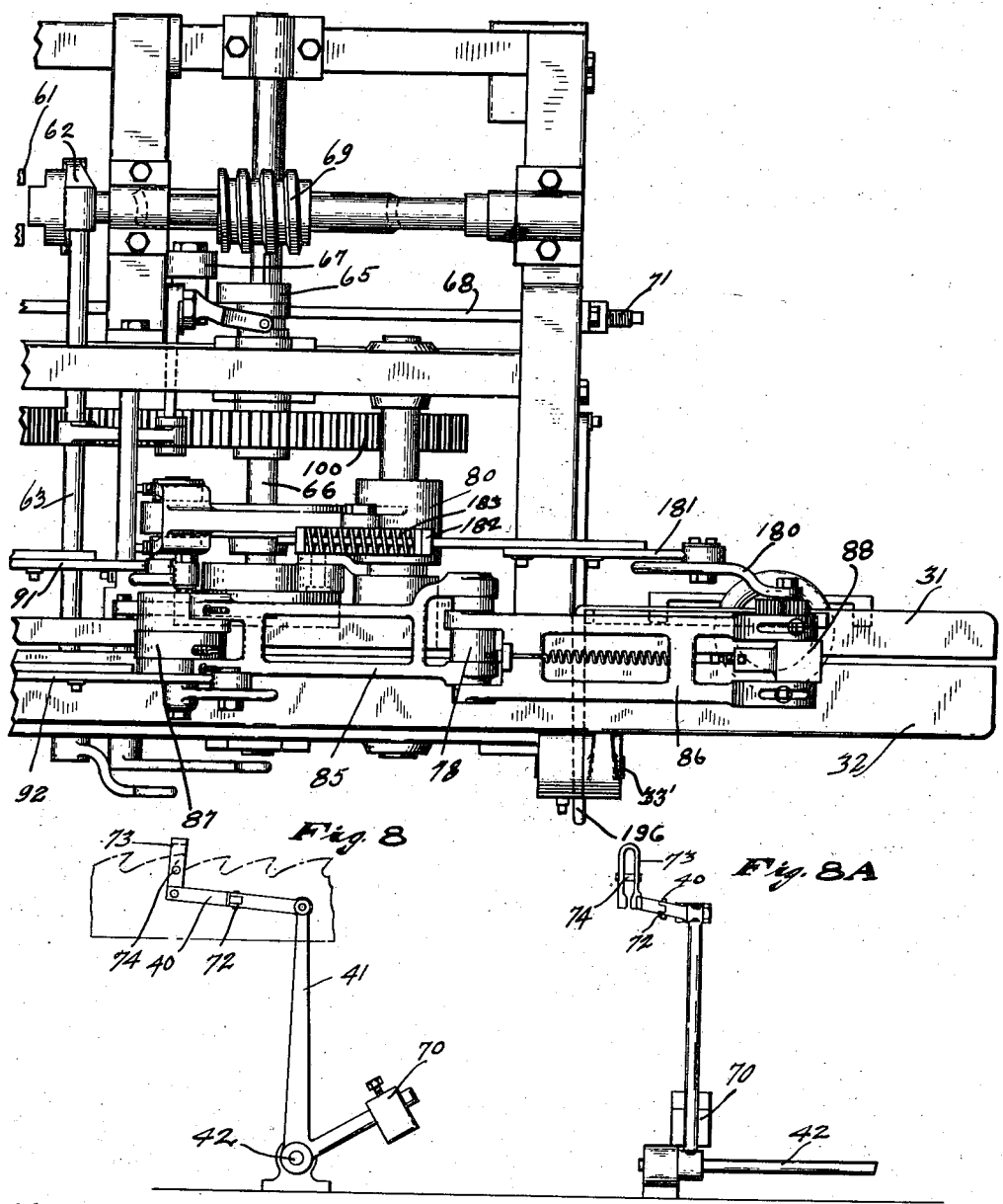

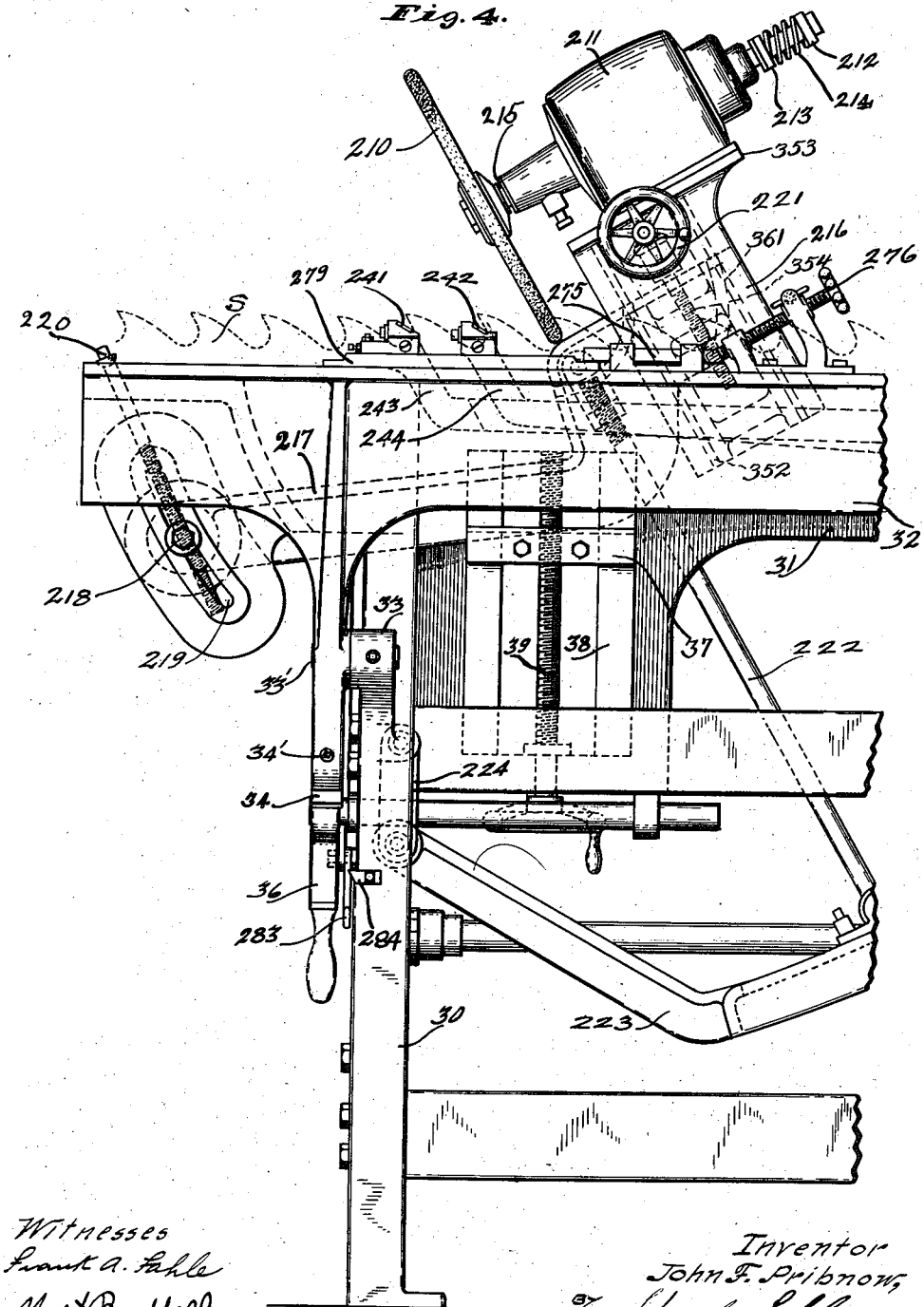

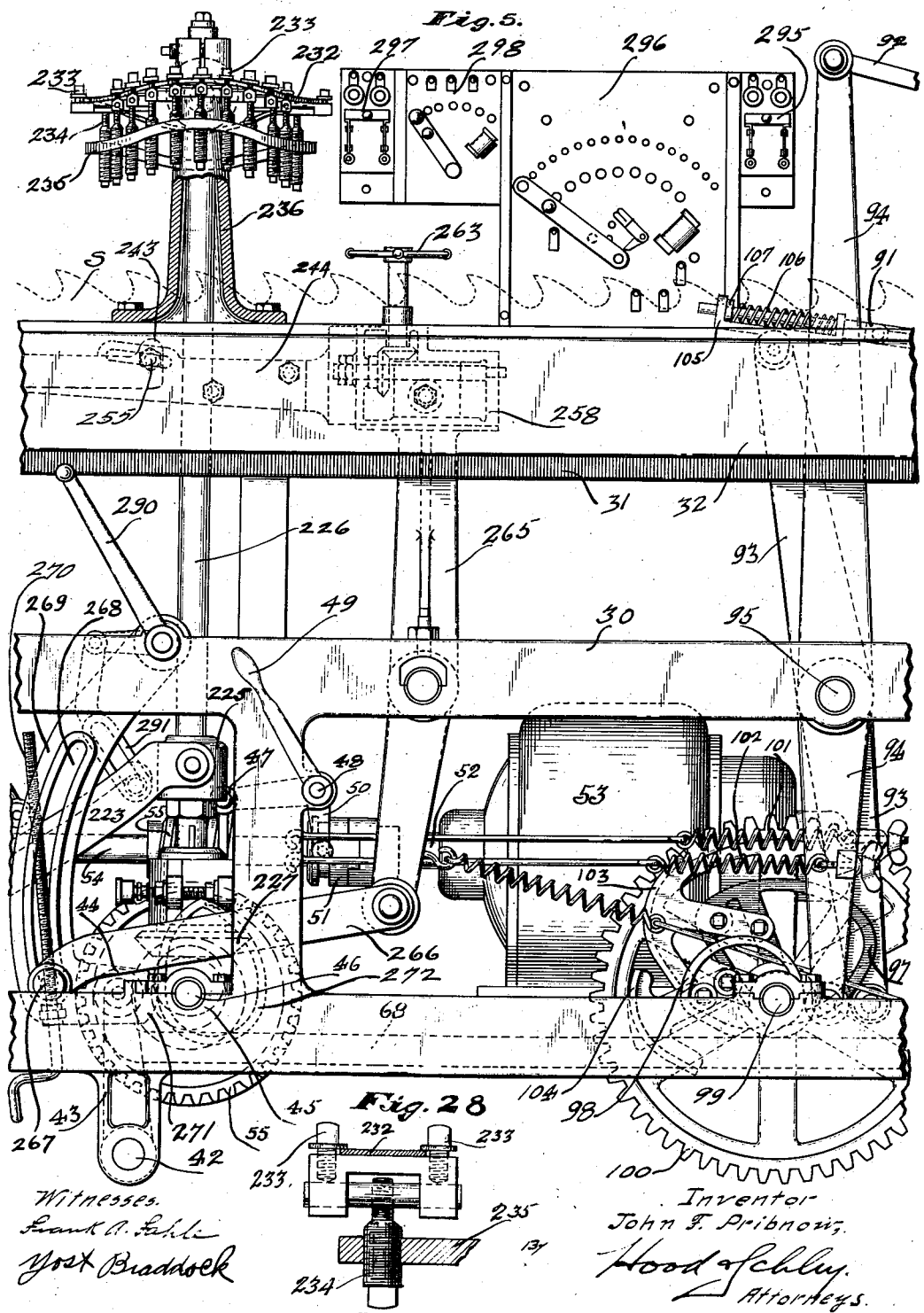

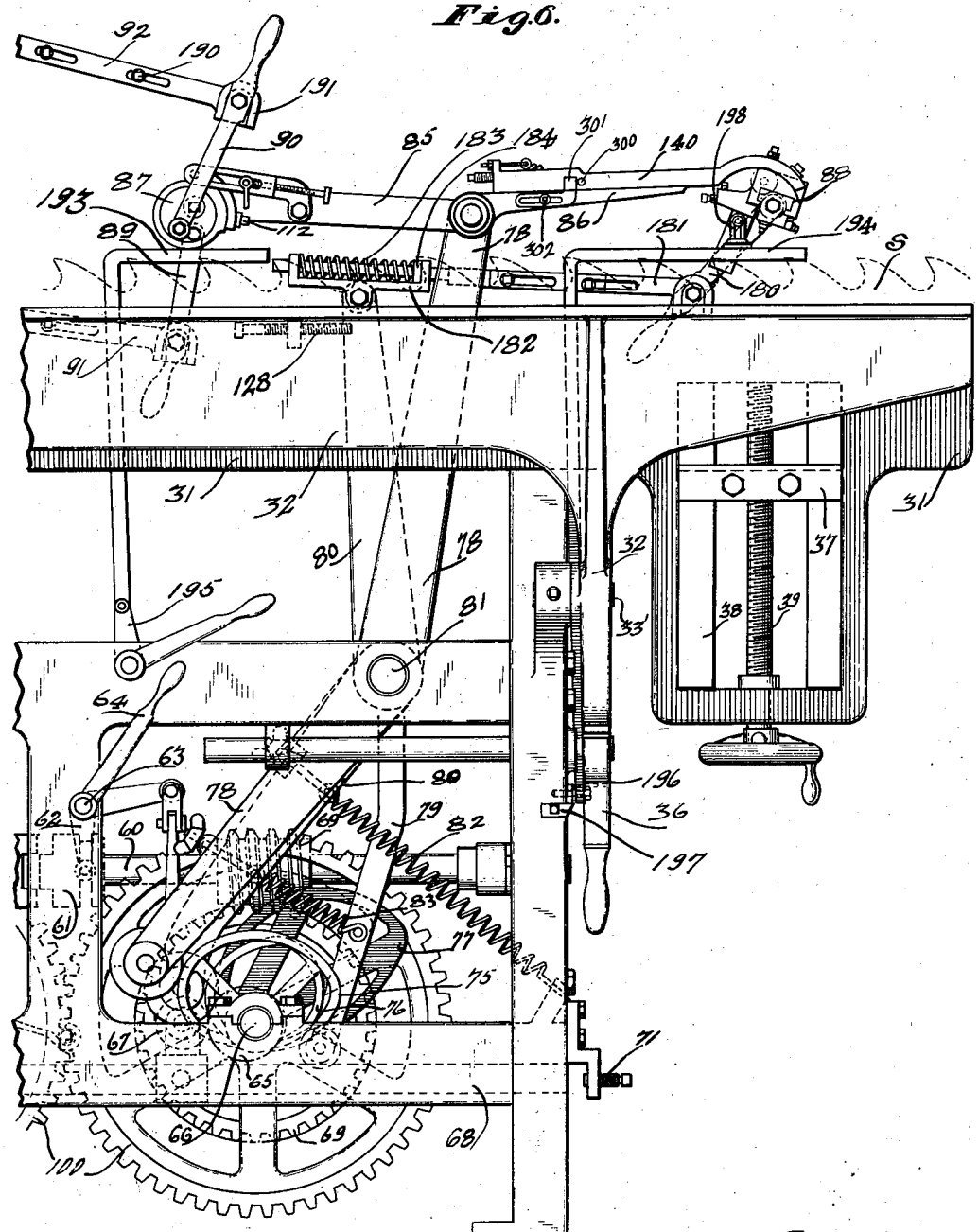

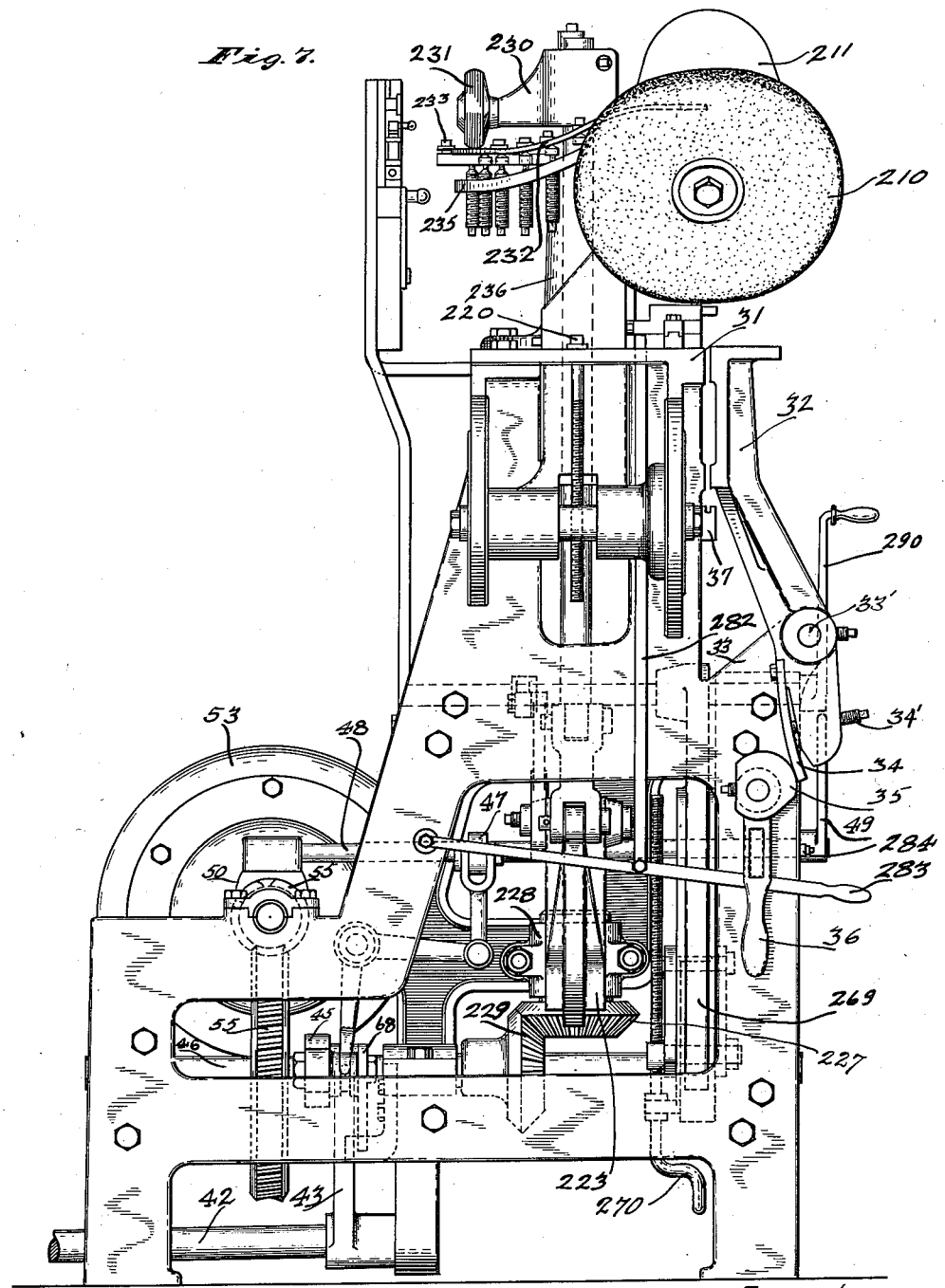

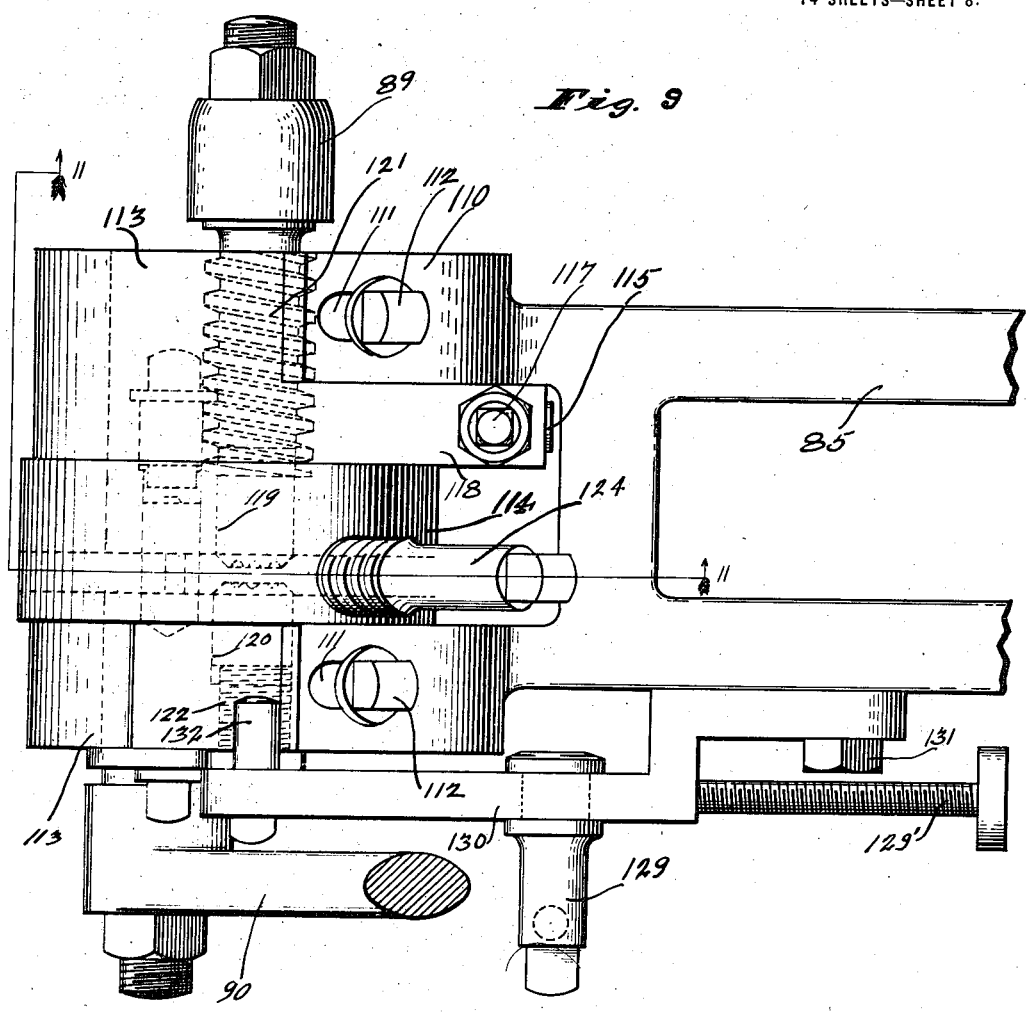

J. F. PRIBNOW.
SAW SWAGING, SHAPING, AND GRINDING MACHINE.
APPLICATION FILED JUNE 4, 1914.
1,179,556.
Patented Apr. 18, 1916.
14 SHEETS—SHEET 10.
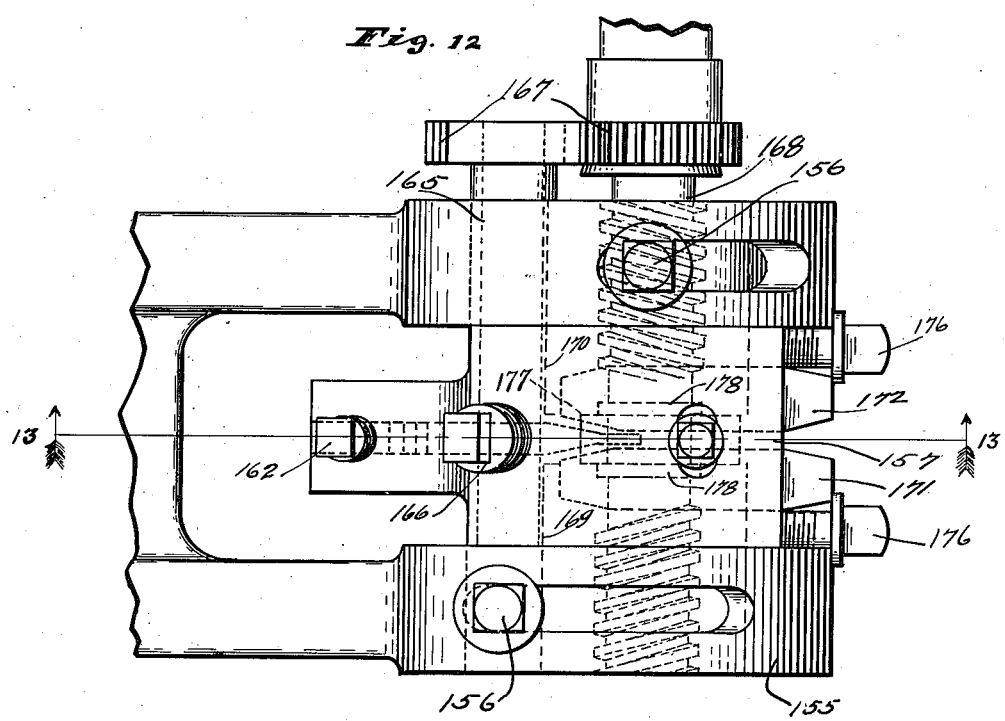
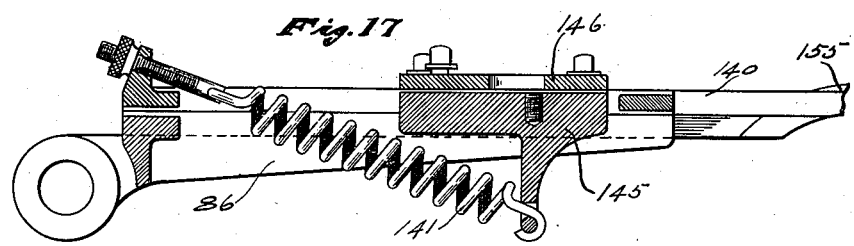
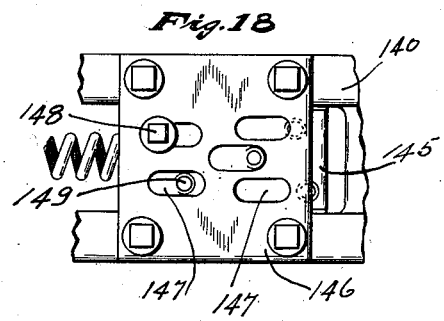
WITNESSES:
INVENTOR
John F. Pribnow,
BY
Hood & Schley
ATTORNEYS.

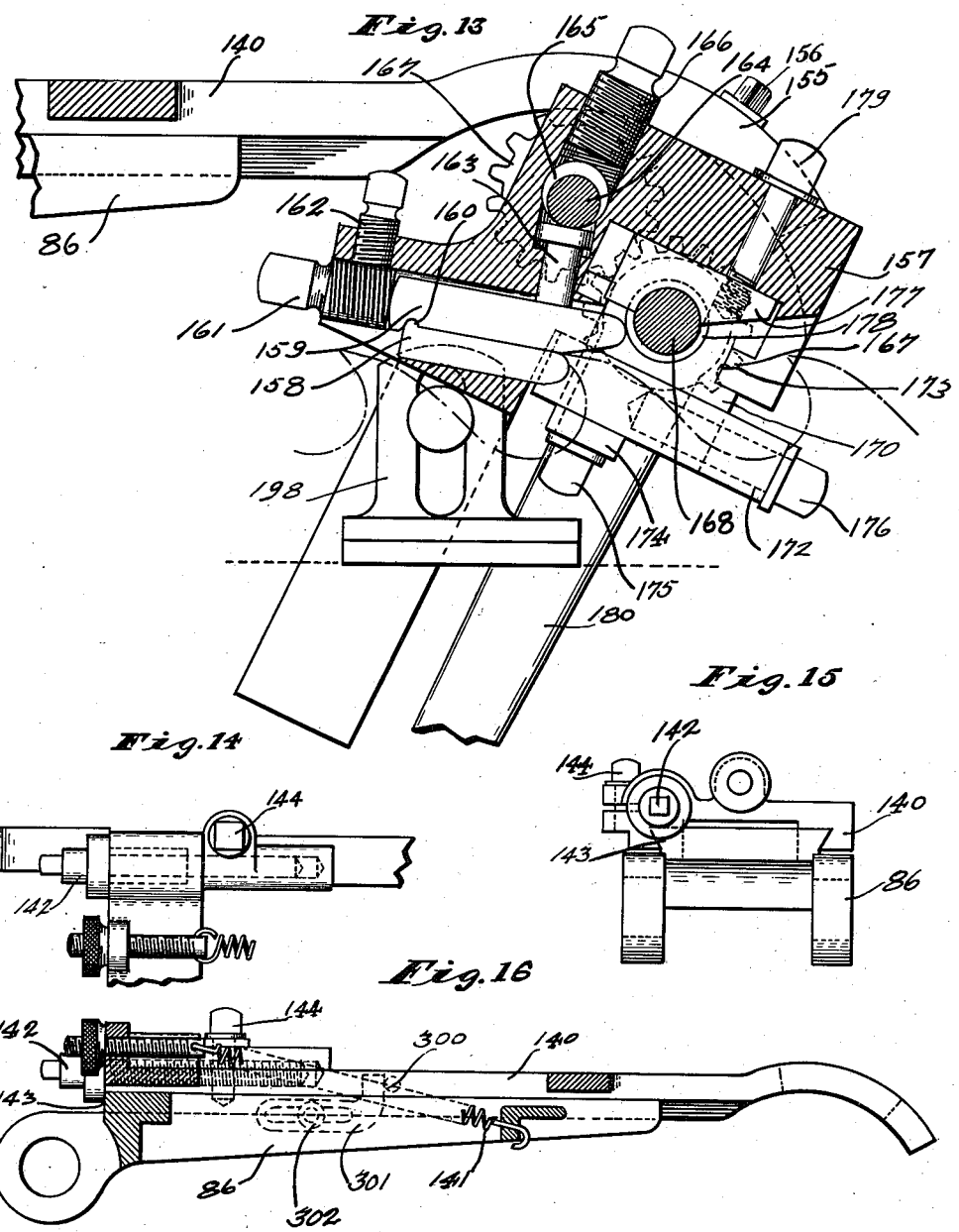

J. F. PRIBNOW.
SAW SWAGING, SHAPING, AND GRINDING MACHINE.
APPLICATION FILED JUNE 4, 1914.

1,179,556.

Patented Apr. 18, 1916.
14 SHEETS—SHEET 12.

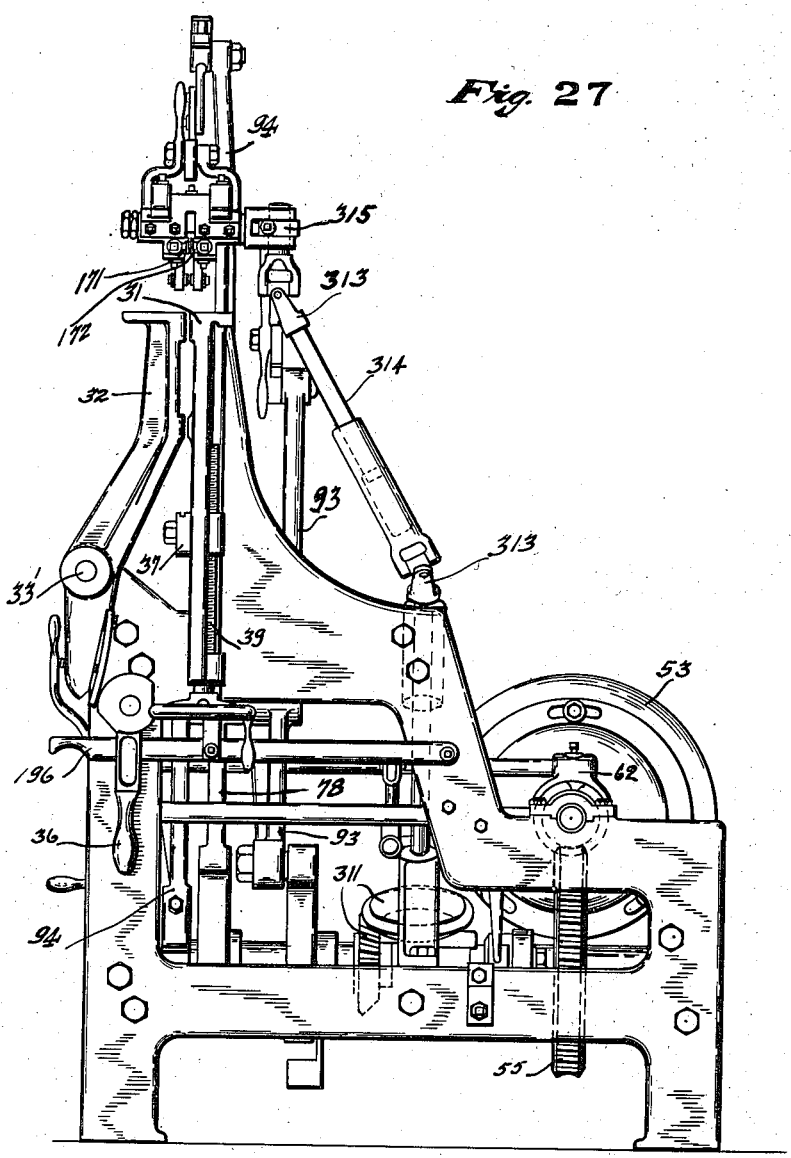

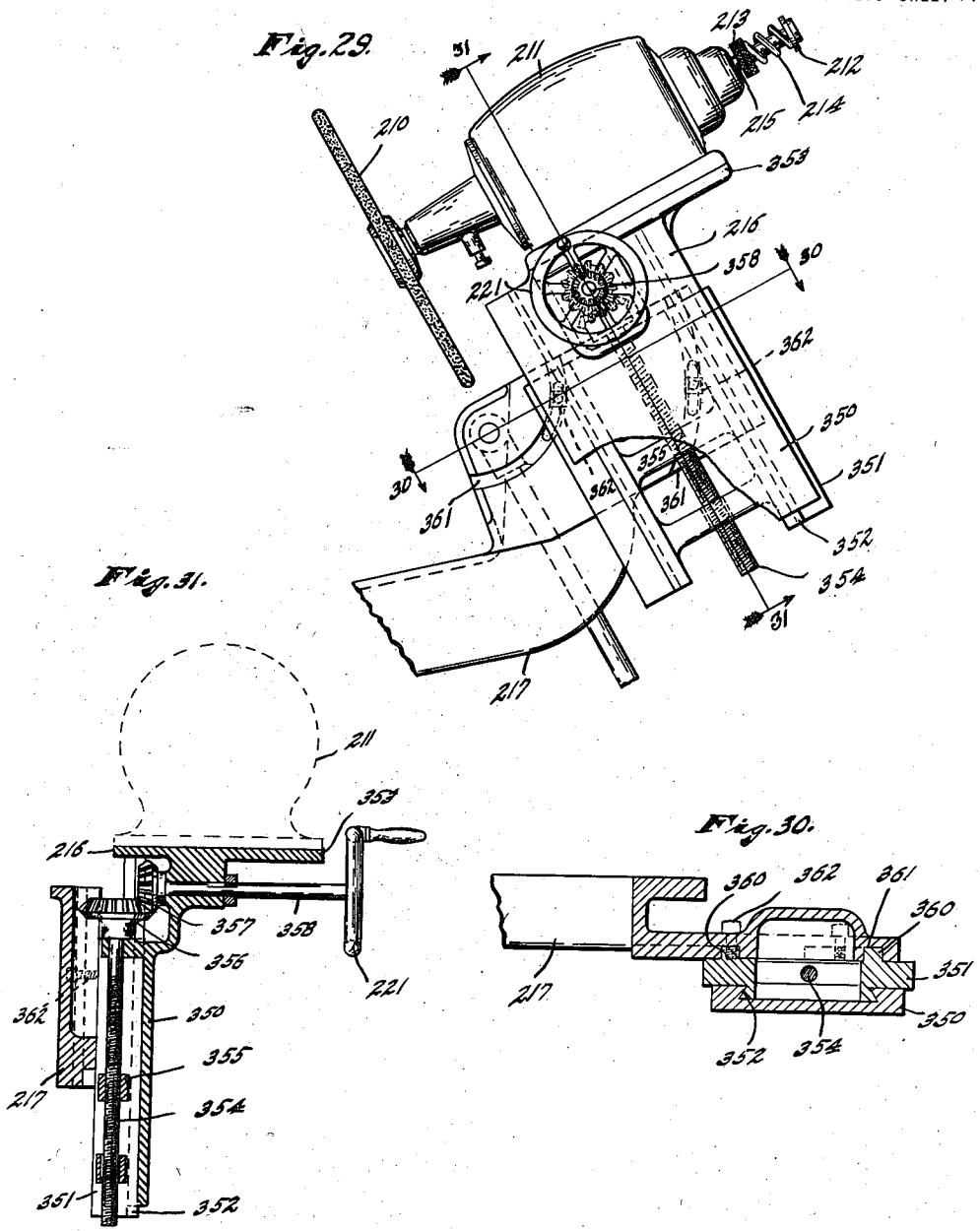

UNITED STATES PATENT OFFICE.

JOHN F. PRIBNOW, OF MELLEN, INDIANA.

SAW SWAGING, SHAPING, AND GRINDING MACHINE.

1,179,556.  Specification of Letters Patent.  Patented Apr. 18, 1916.

Application filed June 4, 1914. Serial No. 842,876.

*To all whom it may concern:*

Be it known that I, JOHN F. PRIBNOW, a citizen of the United States, residing at Mellen, in the county of Ashland and State of Indiana, have invented a new and useful Saw Swaging, Shaping, and Grinding Machine, of which the following is a specification.

It is the object of my invention to provide a machine for automatically swaging, shaping, and grinding saw teeth, particularly of band saws; to make such machine adjustable for different shapes and sizes of saws and saw teeth; to provide for grinding the entire surface of the saw tooth and maintaining an even wear on the grinding surface of the grinding wheel; to provide a feeding device which tends to lessen any inequalities which may exist in the spacing of the saw teeth; to provide an adjustable control cam for the grinding apparatus, whereby the grinding action on different parts of the saw tooth may be accurately controlled independently; to provide a feeding device which pulls the saw instead of pushing it, thereby avoiding any inaccuracies in feeding such as might be due to buckling of the feeding device; to provide rapidly acting swaging and shaping devices which act accurately on the saw teeth as the saw is fed along; to provide a floating grinding wheel, capable of yielding axially in either direction if required to do so by reaction from the saw teeth being ground; to provide a connection between the swaging and shaping devices whereby they may readily be adjusted relatively to each other for different saw tooth spacings and whereby they automatically adjust themselves relatively to each other to provide for accurate action on the saw teeth, these two devices acting simultaneously; and to provide a back feed for feeding properly the opposite side of the band saw from that on which the swaging, shaping, and grinding devices are operating, and to make such back feed operative when any of such devices are working, whether or not the others are working.

The accompanying drawings illustrate my invention.

Figure 25:
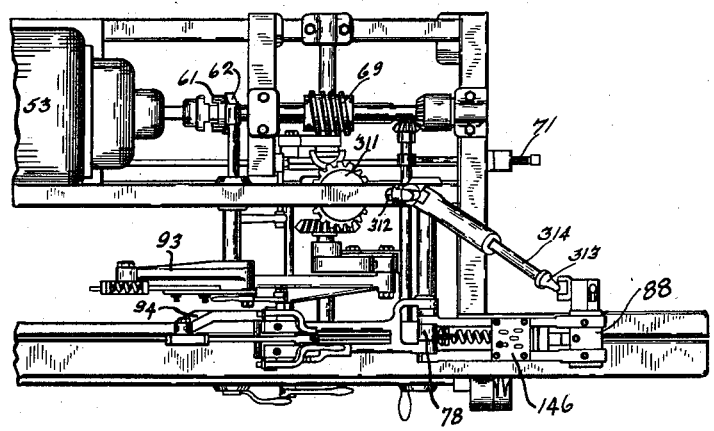
Figure 26:
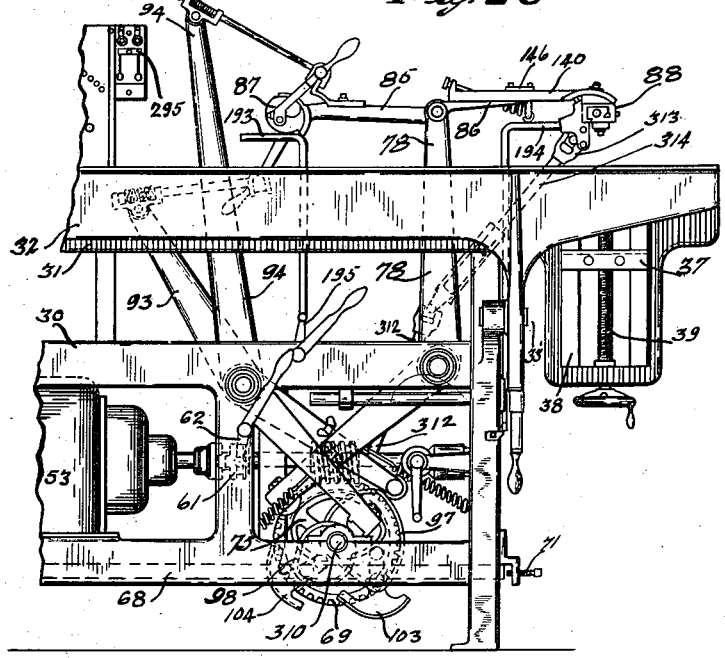

In these drawings, Figures 1, 2, and 3 when placed side by side together provide a plan view of a machine embodying my invention; Figs. 4, 5, and 6 when placed side by side together furnish a front elevation of such machine; Fig. 7 is an end elevation of such machine, taken from the left hand end; Figs. 8 and 8ª illustrate the back feed; Fig. 9 is a plan view of the swaging device; Fig. 10 is a front elevation of the swaging device; Fig. 11 is a section through the swaging device, taken substantially on the line 11—11 of Fig. 9; Fig. 12 is a plan view of the shaping device; Fig. 13 is a section on the line 13—13 of Fig. 12; Figs. 14, 15, and 16 are respectively a plan, an end elevation, and a longitudinal section through the mounting for the shaping device; Figs. 17 and 18 are respectively a longitudinal section and a plan of a modified form of mounting for the shaping device; Figs. 19 and 20 are sectional views, on the line 19—19 of Fig. 20 and the line 20—20 of Fig. 19 respectively, showing the mounting for the feed fingers of the grinding device; Figs. 21, 22, 23, and 24 are respectively a plan view, an elevation from the left hand end, a section on the line 23—23 of Fig. 21, and a section on the line 24—24 of Fig. 21, showing the construction of the feed fingers for the grinding device, Figs. 22 and 24 also showing the frame of the machine in section; Fig. 25 is a plan view of the swaging and shaping end of a machine embodying a modified form of my invention; Fig. 26 is a front elevation of the part of the machine shown in Fig. 25; Fig. 27 is an end elevation of such machine, taken from the right hand end; Fig. 28 is a detail of the adjustable cam for the grinding device; Fig. 29 is a front elevation of the mounting for the grinding device; Fig. 30 is a section on the line 30—30 of Fig. 29; and Fig. 31 is a section on the line 31—31 of Fig. 29.

The main frame 30 is provided at the top and in front with a fixed clamping plate 31, extending the full length of the machine, and coöperating with this is a movable clamping plate 32, also extending the full length of the machine, and carried by arms 33 pivoted on separate pivots 33′ and extending downward beyond such pivots, the arms 32 at their lower ends conveniently being provided with leaf springs 34, adjustable by screws 34′, which springs coöperate with cams 35 carried by levers 36, the two levers 36 being operable independently of each other for moving either end of the movable clamping plate 32 into clamping position. The clamping plates 31 and 32 receive between them that part of the saw S which is to be operated on, and the tightness of the clamping is adjusted so that the saw is held just sufficiently tight so that it will not move forward by momentum but can be moved forward between the clamping plates by the operation of the feeding devices hereinafter described. The bottom or untoothed edge of the saw rests on guide plates 37, at the two ends of the machine respectively, such guide plates conveniently being grooved in their upper edges to receive the saw and being adjustable vertically in guide ways 38 by adjusting screws 39.

The part of the band saw opposite that being operated on by the machine, is suitably supported so that it can slide either in the rear of or in front of the machine, and is fed by a finger 40, here called the "back feed" finger because this part of the saw is usually behind the machine, which feed finger is carried by an arm 41 on the rear end of a rock shaft 42, the forward end of which is provided with an arm 43 which at its free end carries a roller 44 operatable by a cam 45 splined on a shaft 46 and movable along such shaft into and out of position to operate the arm 43. This movement of the cam 45 is obtained by means of suitable connections to the arm 47 on a rock shaft 48 having an operating handle 49, said shaft 48 also having an arm 50 which operates a movable clutch member 51 to clutch together one end of the shaft 52 of the main operating motor 53 and a shaft 54 at the same time that it moves the cam 45 into position to operate the arm 43. The shaft 54 drives the shaft 46 through any suitable connection, such as worm gearing 55. The clutch 51 and the cam 45 are placed in operative position when it is desired to grind the saw teeth. The opposite end of the motor shaft 52 may be connected to a shaft 60 by a movable clutch member 61, operable by an arm 62 on a shaft 63 which can be rocked by an operating handle 64; the shaft 63 also being connected by suitable connections to a cam 65 to shift it along a shaft 66 on which it is splined into and out of position to operate a roller 67 carried by slide bar 68 pivotally connected at one end to the arm 43, conveniently by the same pivot which carries the roller 44. The shaft 60 drives the shaft 66 through any suitable gearing, such as worm gearing 69. The clutch 61 and the cam 65 are placed in operative position at the same time, by the operation of the handle 64, when it is desired to operate the swaging and shaping devices. Thus the back feed is operated by either the cam 45 or the cam 65, when either the grinding or the swaging and shaping devices are operating, the rock shaft 42 being turned in a counter-clockwise direction (Fig. 5) by either of these cams and being suitably returned in the opposite direction, as by a weight 70, said return movement being adjustable by a screw 71 coöperating with the end of the slide rod 68 to vary the throw of the back feed finger 40 for different saws. The feed finger 40 is conveniently provided with a joint 72, by reason of which it can be thrown to inoperative position, and also preferably has a saw-spanning yoke 73 which carries a pin 74 directly engaging the saw teeth. The shaft 66 also carries cams 75, 76, and 77, and these three cams coöperate with rollers carried by arms 78, 79, and 80 respectively, these three arms conveniently all being pivoted independently of each other on the same pivot pin 81 and the arms 78 and 80 extending upward beyond such pivot pin. The arm 80 is biased in a counter-clockwise direction around its pivot pin by an adjustable spring 82 to draw the roller on the lower end of such arm against the surface of the cam 77, and the arms 78 and 79 are interconnected by an adjustable spring 83 which draws both of them toward their coöperating cams 75 and 76, the roller on the arm 79 engaging the high and low points on its coöperating cam 76 at the times when the roller on the arms 78 engages the low and high points on its coöperating cam 75, so that there is a semi-positive though yieldably returning action of the arm 78 in the opposite direction from that in which it is moved by its cam. Pivotally mounted on the upper end of the arm 78 are arms 85 and 86, which extend to the left and to the right respectively (as seen in Fig. 6) and carry the swaging device 87 and the shaping device 88 respectively.

The swaging device, which will be described more in detail later, has a clamping arm 89 and a swage-operating arm 90, which are connected by adjustable links 91 and 92 respectively to the upper ends of two arms 93 and 94 respectively, such arms being pivoted at intermediate points, conveniently on a common pivot pin 95, and at their lower ends being provided with rollers which coöperate with cams 97 and 98 respectively, these two cams being mounted on a shaft 99 connected by suitable gearing 100 to the shaft 66. The cams 97 and 98 push the lower ends of the arms 93 and 94 to the right, such arms being returned to the left by adjustable springs 101 and 102 respectively, and also being positively returned during certain parts of their motions by internal cam sections 103 and 104 respectively carried by the cams 97 and 98. The connection between the link 91 and the upper end of the arm 93 is a yieldable one, so that there may be yielding when the clamping arm 89 of the swaging device is operated to its limit of movement, this yielding device comprising a yoke 105 pivoted to the upper end of the arm 93 and having its two arms perforated to receive the left hand end of the link 91, such link being surrounded between the two arms of the yoke by a compression spring 106 which acts between the right hand arm of the yoke and a collar 107 fixed on the link.

The swaging device is illustrated in detail in Figs. 9, 10, and 11. The arm 85 terminates at its left hand end in a pair of arc-shaped members 110, which have slots 111 through which bolts 112 extend for adjustably holding in place two supporting annuli 113. These annuli furnish bearings for the ends of a swage block 114, which has an enlarged middle part which lies between the two annuli 113 and projects out beyond the circumference of its bearing portions. A pin 115 is fixed in the periphery of the swage block 114 at a suitable place, and projects out through a slot 116 in one of the annuli 113, said slot being sufficiently longer than the diameter of the pin 115 to permit a slight relative turning movement between the swage block and the annuli. This turning movement of the swage block in a clockwise direction is limited by the lower edge of the slot 116, while its movement in the other direction is adjustably limited by a screw 117 carried by an arm 118 projecting from one of the annuli 113. The swage block 114 is cut away on its lower side, as indicated in Fig. 11, to provide a slot into which the saw may project. The clamping members 119 and 120 project into this slot from opposite sides in position to grasp the saw substantially at the base of the tooth which is being swaged. The clamping member 119 is pushed inward by a screw 121 to which the arm 89 is fixed, so that said clamping member is clamped and released by the operation of said arm upon the swinging of the lever 93, and the clamping member 120 is adjustably pushed inward by an adjusting screw 122.

The swage block 114 is bored obliquely to receive a swage anvil 123, which fits freely in such bore and is adjustably fed downward by a screw 124 which forms an abutment against which the upper end of the swage anvil bears. When properly adjusted, the swage anvil 123 is clamped in adjusted position by a clamping screw 123', the head of which is shown as countersunk in the front face of the swage block 114 to allow a clear path for the arm 90. The lower end of the swage anvil 123 coöperates with a roller 125 rotatably and eccentrically mounted within a swage shaft 126, which in turn is rotatably mounted within the swage block 114 and projects outward therefrom on the forward side, where it is attached to the swage-operating arm 90. Thus the swage shaft 126 is turned by the operation of the lever 94, thereby forcing the roller 125 toward the lower end of the swage anvil 123, or allowing it to recede therefrom, to effect the swaging of the saw tooth which at that time happens to be between the swage anvil and the roller. The swage shaft 126 is cut away in the plane of the saw, and of the saw-receiving slot in the swage block, between the roller 125 and the swage anvil 123, to allow these to coöperate on the saw tooth; and is also almost completely cut away in the same plane below the roller 125, leaving only a crescent portion 127 for interconnecting the two parts of the shaft 126 on opposite sides of the saw-receiving slot, thereby permitting the shaft to pass over the successive saw teeth with less rise and fall and therefore with less force in the striking of the parts on the saw. The swage shaft 126 is held in place against accidental axial movement by a pivoted arm 126', which normally projects into a groove in the swage shaft but can be turned aside to permit such swage shaft to be withdrawn.

The feeding of the saw during the swaging operation is accomplished by the engagement of the saw tooth with the roller 125 as the swaging device 87 is reciprocated by the rocking of the lever 78, so that the feeding itself forces the saw tooth point firmly up between the roller 125 and the swage anvil 123. The various cams on shafts 66 and 99 are so arranged relatively to one another that during the reciprocation of the swaging device 87 the roller 125 drops successively over the various saw teeth and pulls the saw to the right, the clamping members 119 and 120 are clamped firmly against the base of the saw tooth to prevent relative movement between the saw and the swage device during the swaging operation and during the movement of the saw to the right while still allowing the two to move together to the right, this clamping being in a clockwise direction to bring the pin 115 to the lower edge of the slot 116, after which the swage shaft 126 is operated in a counter-clockwise direction to squeeze the point of the saw tooth between the roller 125 and the swage anvil 123, during the latter part of which movement of the swage shaft the pressure sufficiently overcomes the pull of the arm 89 to cause the swage block in its entirety to be moved in a counter-clockwise direction until the pin 115 engages the stop screw 117, thereby producing a drawing out of the saw tooth between the roller 125 and the swage anvil 123. All this takes place while the saw is being moved to the right a distance equal to the spacing between adjacent teeth, at the conclusion of which movement the proper cams quickly return the shaft 126 in a clockwise direction and the arm 89 in a counter-clockwise direction to release the saw, whereupon the swaging device 87 moves in its entirety to the left to the next saw tooth. The length of reciprocation of the swage device and also of the shaping device is adjusted by a screw 128 which coöperates with the arm 78 to limit the counter-clockwise motion of the latter. The throw of the swage-operating arm 90 in the swage-releasing direction is limited by a stop pin 129, which is slidable by a screw 129' along a slot in an arm 130, this arm being mounted on a pivot pin 131 so that it can be swung either to operative or inoperative position and being provided with a pin 132 which rests on the upper edge of the front annulus 113 when the arm 130 is in operative position, thus supporting such arm.

The shaping device 88 is directly carried by a slide bar 140, which is slidably mounted on the arm 86 so as to slide longitudinally therealong. The slide bar 140 is biased to the right along the arm 86, by an adjustable spring 141, its movement in this direction being limited by a suitable stop. One form of this stop, shown in Figs. 14, 15, and 16, comprises a flanged screw 142 mounted in the slide bar 140, the flange of which engages the left hand edge of an abutment 143 provided on the arm 86 when the movement of the slide bar 140 to the right along the arm 86 reaches the desired limit of movement. The turning of the screw 142 adjusts its flange, the socket for such screw 142 being slotted so that a clamping screw 144 may clamp such screw in adjusted position.

Another form of limiting device for the movement between the arm 86 and the slide bar 140 is shown in Figs. 17 and 18, in which device the arm 86 and the slide bar 140 are provided with cross pieces 145 and 146 respectively, the latter overlying the former and being provided with a number of slots 147 through any one of which a screw 148 can be inserted into the proper one of a number of coöperating screw holes 149 in the cross piece 145, the slots 147 and the screw holes 149 being properly spaced for the different standard saw tooth spacings, and one slot and its coöperating screw hole serving for a number of spacings.

The end of the slide bar 140 terminates in a pair of arc-shaped members 155, provided with slots through which project headed screws 156 which adjustably fasten the shaper head 157 against the inside surfaces of said members 155. The shaper head 157 has a cylindrical surface at its ends, where it coöperates with the members 155, but at its middle portion is enlarged to project outward between such member so that movement of the shaper head crosswise of the slide bar 140 is prevented. The shaper head has a projection to the left, which is perforated to receive the lower and upper tooth gages 158 and 159, which have a head and socket connection 160 with each other so that they may be moved together longitudinally while permitting the upper tooth gage to swing about the head and socket connection a small distance vertically. The two tooth gages are adjustable longitudinally together by a screw 161, which is clamped in adjusted position by a clamping screw 162. A pin 163 bears slidably against the upper surface of the upper tooth gage 159, and an eccentric portion 164 of a cam shaft 165 bears against the upper end of said pin 163 to force the latter downward when the shaft is rotated. A removable screw 166 permits access to this eccentric portion 164 and to the pin 163.

The shaft 165 is connected by gearing 167 to a right and left screw 168, the right and left hand threads on which coöperate with internal threads on slide blocks 169 and 170 respectively, said slide blocks being mounted to slide in the shaper head 157 along the screw 168. The shaper head is cut away at its lower portion, to provide space for the saw and for shaper jaws 171 and 172, which are carried respectively by the two slide blocks 169 and 170, but in order to hold these slide blocks in place the shaper head is provided with hooked guide fingers 173 which take in recesses in the slide blocks 169 and 170. The shaper jaws are clamped in place in the recesses provided for them in the slide blocks 169 and 170 by clamping plates 174 and clamping screws 175, and are adjustable longitudinally by adjusting screws 176, which have flanges bearing against the outer ends of the shaper jaws. The ends of these shaper jaws work against the sides of the saw tooth points and are given the desired shape which such sides are to have, the shaper jaws conveniently being reversible both side for side and end for end; and the tooth gages work against the back and face of the saw tooth points, as shown in Fig. 13. The right and left screw 168 is held against longitudinal movement by a centering block 177, which fits between two flanges 178 on such screw and is held in proper position in the shaper head 157 by a clamping screw 179. The screw 168 is provided with an operating arm 180, which is connected by a link 181 to the upper end of the lever 80, such connection being a yieldable one here shown as comprising a yoke 182 pivoted on the lever 80 and having arms between which is located a compression spring 183 and a collar 184, the latter being fast to the link 181 and the former bearing against such collar and one of the arms of the yoke 182.

During operation, the shaper 88 and the swage 87 work at substantially the same time, as the saw is being moved to the right by the swage, the yielding permitted by the connection between the arm 86 and the slide bar 140 permitting the shaper to adjust itself to the teeth for slight inequalities in spacing. As the swage starts to move the saw to the right, the saw tooth to be shaped is forced up between the tooth gages 158 and 159, and the lever 80 is swung in a clockwise direction sufficiently rapidly so that the arm 180 and screw 168 are swung in a counter-clockwise direction relatively to the shaper head 157, thereby forcing the shaper jaws 171 and 172 toward each other to give the proper shape to the side of the tooth, the gearing 167 at the same time causing the eccentric 164 and pin 163 to push down the upper tooth gage 159 against the back of the tooth point, to maintain it in proper shape. The movement of the jaws 171 and 172 toward each other and of the upper tooth gage downward is completed and the shaping of the tooth finished during each movement of the saw to the right, and lever 80 is swung quickly in a counter-clockwise direction to release the saw from the shaper jaws and the tooth gage upon the completion of such movement of the saw to the right.

The links 91, 92, and 181 are all preferably made adjustable in length, conveniently by being made of two parts connected by a screw and slot connection 190, and each of these links preferably engages its arm 89, 90, or 180 (as the case may be) by a hook 191, whereby the link and arm may be readily disconnected.

In order to provide for throwing the swage and shaper separately into and out of action as desired, while still allowing them to be reciprocated, slides 193 and 194 are provided, these slides being movable vertically, as by a bell-crank lever 195 connected to the vertical supporting rod for the slide 193, or by a lever 196 connected to the vertical supporting rod for the slide 194 and movable to a position above or below a holding stop 197, these slides 193 and 194 when in their lower positions permitting the swage and the shaper respectively to operate on the saw teeth, but when raised lifting the swage and the shaper respectively above and clear of the saw teeth. When the swage is lifted, the lower part of one of the annuli 113 rests on the slide 193, and when the shaper is lifted the shoe 198 attached to it rests slidably upon the slide 194.

The grinding is done at the left hand end of the machine. The grinding wheel 210 is preferably mounted directly on the inclined shaft of a motor 211, such shaft at its upper end being provided with a collar 212 between which and an abutment 213 on the frame of the motor 211 is a compression spring 214. The abutment 213 is conveniently a suitably mounted nut, so that it is adjustable longitudinally of the motor shaft to vary the compression of the spring 214, and by proper adjustment will provide a slight space 215 between the hub of the grinding wheel 210 and the adjacent shaft bearing. This permits the grinding wheel 210 to yield in either direction along its axis, in one case against gravity and in the other case against the spring 214, so that it can accommodate itself to any inacuracies in the relation between the tooth shape and its own movement.

The motor 211 is mounted on a support 216 carried by the free end of a pivoted arm 217 having its pivot 218 adjustable along a slot 219 by means of a screw 220. The support 216 comprises two slidingly interfitting parts 350 and 351, fitting together on a straight dovetail slideway 352, which is inclined as appears from Figs. 4 and 29. The part 350 is provided with a shelf 353 on which the motor 211 is mounted. The two parts 350 and 351 are relatively adjustable along the slideway 352 by a screw 354; which extends parallel to the slideway 352 and extends through a threaded cross piece 355 on the part 351, this screw 354 being provided at this upper end with a bevel gear 356 which engages with a bevel gear 357 on a forwardly extending shaft 358 mounted in the part 350 and provided at its forward end with an operating hand wheel 221. By turning the hand wheel 221, the part 350 and the motor 211 are adjusted along the slideway 352 relatively to the part 351. The part 351 has slide lugs 360 which fit into curved slide grooves 361 in the end of the arm 217, whereby the support 216 as a unit may be adjusted on the end of the arm 217 in such grooves. In this way, the angle of the grinding wheel 210 may be varied. Suitable clamping screws 362 are provided for clamping the lugs 360 in any desired position in the grooves 361. The slide grooves 361 and the slot 219 are arc-shaped, being drawn about the point of the saw tooth being operated on as a center when the arm 217 is in a given position, so that adjustment of the parts along such curved slide grooves or along such slot will be an arcuate adjustment around the point of such saw tooth. The arm 217 is connected by a link 222 of adjustable length to an arm 223, pivotally supported at its left hand end on a link 224 in turn carried by the frame 30. The right hand end of the arm 223 is pivotally connected to a sleeve 225 on a vertical shaft 226, the sleeve and shaft being vertically movable together, and the shaft being splined within the hub of a bevel gear 227 mounted for rotation only in a fixed bearing 228 and meshing with a bevel gear 229 on the shaft 46. The upper end of the vertical shaft 226 has fixed thereto an arm 230 carrying a roller 231 at its outer end, and this roller rides on a flexible adjustable cam 232 to cause the shaft 226 to be moved up and down. This in turn, through the mechanism just described, causes the grinding wheel 210 to be swung up and down about the pivot pin 218.

The cam 232 consists of a ring of flexible metal, such as thin steel, which is supported by a number of clamps 233 arranged around its periphery, though in position not to interfere with the roller 231, such clamps 233 gripping both the inner and outer edges of the metal ring and being supported on the upper ends of screws 234 carried by a stiff annulus 235 which has the approximate general shape which the ring 232 should have and is supported on a hollow column 236 through which the shaft 226 extends and in which it has its upper bearing. By turning the various screws 234, the cam shape of the ring 232 can be adjusted as desired, to vary the relative times and speeds of different parts of the up and down movement of the grinding wheel 210 about the pivot pin 218. In order that this up and down movement of the grinding wheel may act properly on the saw teeth, it is necessary that the saw teeth be fed forward under the grinding wheel. This is done by means of a pair of feed fingers 241 and 242, carried by two arms 243 and 244 respectively and spaced slightly farther apart, by a few thousandths of an inch, than the proper spacing between adjacent saw teeth. This relative adjustment is obtained by a screw 245 carried by a stud 246 in the arm 243 and projecting through a slot in a slide 247 which is the part in which the feed finger 241 is directly mounted, the slide 247 being clamped in adjusted position on the arms 243 by a nut 248 on the upper end of the stud 246. By reason of the slight difference in the spacing between the feed fingers 241 and 242 and the spacing between adjacent saw teeth, the feeding operation of the feed fingers as they are reciprocated as later described tends to smooth out any inequalities which may exist in the spacing of the saw teeth, for when a normal or a narrow space is reached the finger 242 operates on the saw and causes a normal or greater than normal grinding of the tooth, while when a wider space is reached the feeding is done by the finger 241 and causes a less heavy grinding of the tooth.

The arm 243 is pivoted on the arm 244 on an adjustable pivot pin 255, which furnishes another, though less delicate means for adjusting the distance between feed fingers 241 and 242. The arm 244 at its right hand end is provided with a trunnion 256 which rotatably fits within a slide block 257, mounted within a slideway 258 and held therein by a pin 259 and a plate 260 which bears against the opposite side of the slideway from that against which the arm 244 bears, as shown in Fig. 20. The slide block 257 is adjustable along the slideway 258 by a screw 261, conveniently connected by bevel gearing 262 to an operating shaft and wheel 263.

The slideway 258 forms the upper end of a lever 265, which is pivoted in the frame 30 and projects both above and below it, the lower end of such lever being pivotally connected to one end of a link 266, the other end of which is pivoted to a slide block 267 slidable along a slot 268 in a pivoted arm 269, the sliding of the block 267 along the slot 268 being obtained by an adjusting screw 270. The free end of the arm 269 is provided with a finger 271 which bears against a cam 272 fixed on the shaft 46, so that when such shaft is rotated the arm 269 and the lever 265 are swung about their pivots and the feed fingers 241 and 242 are reciprocated to feed the saw to the right, the fingers riding up over the backs of the teeth and dropping in front of them. The length of reciprocation is controlled by the screw 270, and the position of the space in which the reciprocation takes place is shifted longitudinally of the frame by operating the wheel 263 to shift the slide block 257 in the slideway 258. A convenient gage for use in making this adjustment may be provided by the gage block 275, which is slidable longitudinally along the frame 30 by a screw 276 to coöperate with the free end of the arm 244.

The free ends of the arms 243 and 244 are broadened to provide heads 277 and 278, which slide along slide bars 279 fastened to the upper edge of the frame 30 on the two sides of the slot through which the arms 243 and 244 project upward, and these heads are provided with rollers 280 on the side away from the saw, these rollers coöperating with a horizontally extending slide bar 281 which is movable vertically to lift the feed fingers above and clear of the saw teeth or to allow such feed fingers to drop into engagement with the saw teeth, the vertical movement of this slide bar 281 here being obtained by connecting it by a vertical bar 282, conveniently integral with the bar 281, to a hand lever 283 which can be swung up and down around a horizontal pivot, a suitable finger 284 being provided for holding the lever 283 in its upper position.

When the grinder is operating, which it does when the clutch 51 is in clutching position, the feed fingers are reciprocated as above described to feed the saw forward a tooth at a time, and at the same time, by the operation of the roller 231 on the adjustable cam 232, the grinding wheel 210 is swung up and down around the pivot pin 218. By proper adjustment of the cam 232, the relative movement of the grinding wheel 210 up and down and the feeding of the saw forward by the feed fingers 241 and 242 may be made such that the grinding wheel follows closely the shape of the saw tooth, the saw remaining substantially stationary as the grinding wheel starts downward and grinds the face of the tooth and being moved forward first slowly and then more rapidly as the grinding wheel goes down into the throat between the saw teeth, the grinding wheel being moved upward as the throat is passed so as to follow the curve of the back of the cam tooth. By proper adjustment of the cam 232 any desired shape of saw tooth may be followed in this manner, and the grinding surface of the grinding wheel is worn away substantially uniformly. If the adjustment of the cam 232 is not quite correct for the teeth of the saw being operated on, the shaft of the grinding motor 211 will move slightly endwise in either direction, against gravity or the spring 214, to allow the wheel to adjust itself to the saw tooth. The grinding wheel may be thrown out of operation on the saw teeth by a bell-crank lever 290, which is connected by a slotted link 291 to the arm 223, so that upon turning the bell-crank lever 290 about its pivot the collar 225 and shaft 226 are lifted upward to make the roller 230 move entirely clear of the cam 232 even at the highest point of the latter.

The main motor 53 and the grinding motor 211 are conveniently separately controlled, a switch 295 and a rheostat 296 being provided for the main motor and a switch 297 and rheostat 298 being provided for the grinding motor. The electrical connections are omitted from the drawing, as they are merely the ordinary ones, the motor 211, of course, being connected to its controlling apparatus through some suitable flexible connection to permit its movement.

In general operation, the saw to be treated is placed on the guide plates 37 and between the clamping plates 31 and 32, and the guide plates 37 are adjusted to the proper height. Then the clamping lever 36 is pushed downward, thereby forcing the movable clamping plate 32 against the saw to hold the latter between two clamping plates; conveniently this clamping is done only at the end of the machine at which the saw is operated on, that is either at the swaging and shaping end or at the grinding end, for ordinarily it is found desirable not to attempt the grinding when either swaging or shaping is being done, although swaging and shaping are done together. At this time, the slide bars 193, 194, and 281 are all elevated, and the bell-crank lever 290 is thrown to hold the roller 230 clear of the cam 232. The motor 53 is now started and the clutch 62 is thrown to operative position, thereby causing the rotation of the shaft 66, which operates the back feed by means of the cam 65. The slide bar 193 is now lowered to allow the swaging device 87 to engage the teeth, which it does, feeding the saw forward and at the same time swaging the teeth as already described. As soon as the first tooth swaged comes under the shaping device 88, the latter is dropped upon the saw teeth, by the lowering of the bar 194, and operates to shape the teeth, in the manner already described, the relative sliding between the arm 86 and the slide bar 140 allowing the shaper to adjust itself to the saw teeth. When all the teeth have been swaged, the swaging device 87 is lifted by the raising of the slide bar 193, whereupon the feeding is continued by the shaping device 88, which is allowed to continue to act until all the teeth have been shaped, the slide bar 194 then being raised to lift the shaping device clear of the saw teeth. During the feeding by the shaping device, relative movement between the arm 86 and the slide bar 140 goes to the limit of movement in each direction, such limits being determined in the arrangement shown in Figs. 14, 15, and 16 by the flange 143 in one direction and in the other by the engagement of a pin 300 carried by the slide bar 140 with a stop bar 301 having an adjustable pin and slot connection 302 with the arm 86, and in the arrangement shown in Figs. 17 and 18 by the engagement of the pin 148 with the two ends of the slot 147 in which it is placed.

When the teeth are all swaged and shaped, and the swaging and shaping devices have been lifted out of engagement with the teeth, the clutch 61 is thrown out of operative position and the clutch 51 thrown into operative position. At the same time, usually, the clamping plate 32 at the right hand end of the machine is released and that at the left hand end tightened. The shaft 66 now remains stationary while the shaft 46 operates, and the back feed is now operated by the cam 45. The slide bar 281 is now dropped to allow the fingers 241 and 242 to engage the teeth, so that the saw is fed forward, and then the bell-crank lever 290 is turned to allow the roller 231 to coöperate with the cam 232, which is properly adjusted for the shape of the saw tooth, the grinding motor now being running. The grinding wheel 210 now grinds the tooth as already described. When all the teeth have been ground, the lever 290 is turned to lift the grinding wheel away from the saw teeth, and the slide bar 281 is lifted to throw the fingers 241 and 242 out of engagement, whereupon the motor 53 is ordinarily stopped and the clutch 51 thrown out of operative position. The fully treated saw is now removed from the machine.

In Figs. 25, 26, and 27 is shown a slight modification of the operating mechanism for the swaging and shaping device. Here a single shaft 310 is used instead of the two shafts 66 and 99, and the lower ends of the levers 78, 93, and 94 are arranged to coöperate with the cams on this single shaft. In this modified arrangement, the lever 80 is omitted, and in place of it a bevel gearing 311 is provided whereby the shaft 310 drives a shaft 312, which is connected through universal joints 313 and an extensible shaft 314 to an eccentric or cam 315 arranged to operate the shaper jaws 316 to produce the desired shaping of the saw teeth. The details of this shaper mechanism form no part of the invention claimed in this application and are shown in my co-pending application Ser. No. 842,877, of even filing date herewith.

While the details of the swaging, shaping, and grinding devices have been described with some particularity, yet they are not essential to the broad aspects of my invention, but are only essential when specifically called for in the claims.

I claim as my invention:

1. In a machine for treating the teeth of saws, the combination of a grinding wheel, a pivoted arm carrying said grinding wheel, the pivot of said arm being adjustable and extending transversely of the axis of the grinding wheel, means for oscillating said arm and grinding wheel about the pivot of said arm, and means for feeding the saw forward during such oscillation.

2. In a machine for treating the teeth of saws, the combination of a grinding wheel, a pivoted arm carrying said grinding wheel, the pivot of said arm being adjustable and extending transversely of the axis of the grinding wheel, means for oscillating said arm and grinding wheel about the pivot of said arm, said means including a fixed flexible cam adjustable to different shapes and a roller coöperating with said cam, and means for feeding the saw forward during such oscillation.

3. In a machine for treating the teeth of saws, the combination of a grinding wheel, a pivoted arm carrying said grinding wheel, the pivot of said arm being adjustable and extending transversely of the axis of the grinding wheel, means for oscillating said arm and grinding wheel about the pivot of said arm, said means including a flexible cam adjustable to different shapes and a roller coöperating with said cam, and means for feeding the saw forward during such oscillation.

4. In a machine for treating the teeth of saws, the combination of a grinding wheel, a pivoted arm carying said grinding wheel, the pivot of said arm being adjustable and extending transversely of the axis of the grinding wheel, means for oscillating said arm and grinding wheel about the pivot of said arm, said means comprising a flexible cam adjustable to different shapes, a shaft, a transverse arm carried by said shaft and coöperating with said cam to cause the shaft to move lengthwise, and connections between said shaft and said pivoted arm whereby the lengthwise movement of said shaft rocks said arm and said grinding wheel, and means for feeding the saw forward during such oscillation.

5. In a machine for treating the teeth of saws, means for supporting the saw to be operated on, means for feeding the saw along said support, a rock arm pivoted on an axis transverse to the plane of the saw and intersecting such plane on the same side of the line joining the points of the saw teeth as are the bases of the saw teeth, a grinding wheel carried by said arm and rotatable on an axis lying in the plane of the saw, the axis of said grinding wheel being oblique to the line joining the saw tooth points and the pivotal axis of said rock arm being spaced from the tooth being operated on in the direction toward which the tooth faces, and means for rocking said rock arm on its pivot to cause said grinding wheel to act upon the successive saw teeth as the saw is fed along its support.

6. In a machine for treating the teeth of saws, means for supporting the saw to be operated on, means for feeding the saw along said support, a rock arm pivoted on an axis transverse to the plane of the saw and intersecting such plane on the same side of the line joining the points of the saw teeth as are the bases of the saw teeth, a grinding wheel carried by said arm, the axis of said grinding wheel being oblique to the line joining the saw tooth points and the pivotal axis of said rock arm being spaced from the tooth being operated on in the direction toward which the tooth faces, and means for rocking said rock arm on its pivot to cause said grinding wheel to act upon the successive saw teeth as the saw is fed along its support.

7. In a machine for treating the teeth of saws, means for supporting the saw to be operated on, means for feeding the saw along said support, a rock arm pivoted on an axis transverse to the plane of the saw and intersecting such plane on the same side of the line joining the points of the saw teeth as are the bases of the saw teeth, a grinding wheel carried by said arm and rotatable on an axis lying in the plane of the saw, the axis of said grinding wheel being oblique to the line joining the saw tooth points, and means for rocking said rock arm on its pivot to cause said grinding wheel to act upon the successive saw teeth as the saw is fed along its support.

8. In a machine for treating the teeth of saws, means for supporting the saw to be operated on, means for feeding the saw along said support, a rock arm adjustably pivoted on an axis transverse to the plane of the saw and intersecting such plane on the same side of the line joining the points of the saw teeth as are the bases of the saw teeth, a grinding wheel carried by said arm, the axis of said grinding wheel being oblique to the line joining the saw tooth points, and means for rocking said rock arm on its pivot to cause said grinding wheel to act upon the successive saw teeth as the saw is fed along its support.

9. In a machine for treating the teeth of saws, means for supporting the saw to be operated on, means for feeding the saw along said support, a rock arm pivoted on an axis transverse to the plane of the saw and intersecting such plane on the same side of the line joining the points of the saw teeth as are the bases of the saw teeth, a grinding wheel carried by said arm, the axis of said grinding wheel being oblique to the line joining the saw tooth points, and means for rocking said rock arm on its pivot to cause said grinding wheel to act upon the successive saw teeth as the saw is fed along its support.

10. In a machine for treating the teeth of saws, the combination of means for supporting the saw, means for feeding the saw along said support, a rock arm, a grinding wheel carried by said rock arm and yieldable in both directions along its axis, and means for operating said rock arm to cause said grinding wheel to coöperate with the successive teeth of the saw as the saw is fed along its support.

11. In a machine for treating the teeth of saws, the combination of means for supporting the saw, means for feeding the saw along said support, a rock arm, a motor carried by said rock arm, a grinding wheel on the shaft of said motor, said motor shaft being yieldable axially in either direction, and means for rocking said rock arm to cause said grinding wheel to act on the successive saw teeth as the saw is fed along its support.

12. In a machine for treating the teeth of saws, the combination of a rotatable grinding wheel, a movable frame carrying said grinding wheel, a flexible cam provided with means for adjusting its shape, said cam being normally fixed, and means movable relatively to said cam and shiftable thereby during such movement, said last-named means being connected to said movable frame for moving the latter.

13. In a machine for treating the teeth of saws, the combination of a rotatable grinding wheel, a movable frame carrying said grinding wheel, a flexible cam provided with means for adjusting its shape, and means movable relatively to said cam and shiftable relatively thereto by such movement so as to produce a relative movement between the two conforming to the shape of the cam throughout the time the grinding wheel engages a saw tooth, said last-named means being connected to said movable frame for moving the latter.

14. In a machine for treating the teeth of saws, the combination of a rotatable grinding wheel, a movable frame carrying said grinding wheel, a circular flexible cam various parts of which are relatively adjustable to different planes, said cam being stationary, a rotatable shaft, and an arm carried by said shaft and coöperating with said cam to produce lengthwise movement of the shaft, said shaft and said frame being connected so that such lengthwise movement produces movement of the grinding wheel and frame.

15. In a machine for treating the teeth of saws, the combination of a rotatable grinding wheel, a movable frame carrying said grinding wheel, a circular flexible cam various parts of which are relatively adjustable to different planes, a shaft, said cam and shaft being relatively rotatable, and an arm carried by said shaft and coöperating with said cam to produce lengthwise movement of the shaft, said shaft and said frame being connected so that such lengthwise movement produces movement of the grinding wheel and frame.

16. In a machine for treating the teeth of saws, the combination of a normally stationary flexible cam adjustable to different shapes, a movable member coöperating with said cam, and a device movable by said movable member and operating on the saw tooth.

17. In a machine for treating the teeth of saws, the combination of a flexible cam adjustable to different shapes, a member coöperating with said cam, and a device movable by said member and operating on the saw tooth, the movement of said device conforming to the shape of said cam throughout the time said device engages a saw tooth.

18. In a machine for treating the teeth of saws, the combination of a grinding wheel, a pivoted arm carrying said grinding wheel, the pivot of said arm being adjustable substantially in an arc drawn about the point of the tooth being operated on as a center and extending transversely of the axis of the grinding wheel, means for oscillating said arm and grinding wheel about the pivot of said arm, and means for feeding the saw forward during such oscillation.

19. In a machine for treating the teeth of saws, the combination of a grinding wheel, a support carrying said grinding wheel and comprising two relatively sliding parts and means for sliding them relatively to each other to adjust the position of the grinding wheel, and a pivoted arm on which said support is carried, the pivot of said arm extending transversely of the axis of the grinding wheel, said support being adjustable on said arm substantially in an arc drawn about the point of the tooth being operated on when the arm is in a certain position.

20. In a machine for treating the teeth of saws, the combination of a grinding wheel, a support carrying said grinding wheel, and a pivoted arm on which said support is carried, the pivot of said arm extending transversely of the axis of the grinding wheel, said support being adjustable on said arm substantially in an arc drawn about the point of the tooth being operated on when the arm is in a certain position.

21. In a machine for treating the teeth of saws, the combination of a grinding wheel, a support carrying said grinding wheel and comprising two relatively sliding parts and means for sliding them relatively to each other to adjust the position of the grinding wheel, and a pivoted arm on which said support is carried, the pivot of said arm extending transversely of the axis of the grinding wheel.

In witness whereof, I, have hereunto set my hand at Indianapolis, Indiana, this twenty-ninth day of May, A. D. one thousand nine hundred and fourteen.

JOHN F. PRIBNOW.

Witnesses:
JOSEPHINE GASPER,
G. B. SCHLEY.